United States Patent [19]

Nakayama et al.

[11] Patent Number: 4,757,336
[45] Date of Patent: Jul. 12, 1988

[54] VIEW FINDER OF VARIABLE MAGNIFICATION

[75] Inventors: Hiroki Nakayama; Yasuhisa Sato; Kouji Oizumi, all of Kanagawa; Yasuyuki Yamada, Tokyo, all of Japan

[73] Assignee: Canon Kabushiki Kaisha, Tokyo, Japan

[21] Appl. No.: 820,626

[22] Filed: Jan. 21, 1986

[30] Foreign Application Priority Data

Jan. 21, 1985 [JP] Japan ................................ 60-008838

[51] Int. Cl.$^4$ .................. G03B 13/02; G02B 15/00
[52] U.S. Cl. ..................................... 354/219; 350/423
[58] Field of Search ............... 354/219, 222, 223, 155; 350/410, 423

[56] References Cited

U.S. PATENT DOCUMENTS 4,623,226 11/1986 Fujii ............................... 350/423 X
4,624,536 11/1986 Nakagawa ........................ 350/423

FOREIGN PATENT DOCUMENTS 190934 11/1982 Japan ................................ 354/155
237134 7/1945 Switzerland ...................... 354/219
2068579 8/1981 United Kingdom ............... 350/410

Primary Examiner—Donald A. Griffin
Attorney, Agent, or Firm—Toren, McGeady & Associates

[57] ABSTRACT

A view finder having, from front to rear, a first lens unit of negative power, a second lens unit of positive power and a third lens unit of negative power, the second lens unit being moved axially forward as the magnification varies from the smallest to the largest value, while the first lens unit is moved to compensate for the diopter shift resulting from the variation of the magnification.

7 Claims, 11 Drawing Sheets

WIDE ANGLE

TELEPHOTO

WIDE ANGLE

TELEPHOTO

VIEW FINDER OF VARIABLE MAGNIFICATION

BACKGROUND OF THE INVENTION

1. Field of the Invention:

This invention relates to variable magnification view finders, and, more particularly, to variable magnification view finders suited to be used in photographic cameras, or video cameras. Still more particularly, the present invention relates to the maintenance of a constant diopter of the finder during variation of the magnification of the finder image.

2. Description of the Prior Art:

In cameras whose photographic system and finder system are constructed separate from each other, when the photographic system is of the zoom type, it has been preferred, from the framing standpoint, that the magnification of the finder image is variable in proportion to the magnification of the image on the film. From another standpoint of its being built in the camera, it has been preferred that the finder be of reduced size, and its structure amenable to producing a desired range of magnifications of the finder image.

There has been a previous proposal for modification of the reverse-Galilean finder to a variable magnification one in such a way that the objective lens of negative power is divided into two parts of opposite power to each other, of which the rear or negative part is made to move toward the eyepiece of positive power to vary the magnification of the finder image, as disclosed in Japanese Laid-Open Patent Application No. SHO 53-63014.

Also in Japanese Patent Publication No. SHO 29-2927, not only the objective lens of the reverse-Galilean finder is divided into positive and negative parts of which the negative part is moved toward the eyepiece, but also the eyepiece is divided into positive and negative parts of which either one or both are made movable in that region of the range of magnifications which is associated with a large change of the diopter, thus providing a variable magnification finder.

These prior known variable magnification finders are, however, all imperfect in compensating for the diopter shift resulting from the variation of the magnification. So it has been difficult to obtain a good finder image throughout the entire range of variation of the magnification.

SUMMARY OF THE INVENTION

An object of the present invention is to provide a view finder of variable magnification.

Another object is to achieve a possibility of maintaining a constant diopter throughout the entire range of variation of the magnification.

BRIEF DESCRIPTION OF THE DRAWINGS

FIGS. 9A and 9B to 15A and 15B are graphic representations of the aberrations of the lens systems of FIGS. 2 to 8, respectively, in the wide angle and telephoto ends of the finder.

DETAILED DESCRIPTION OF THE PREFERRED EMBODIMENTS

Figure 1:
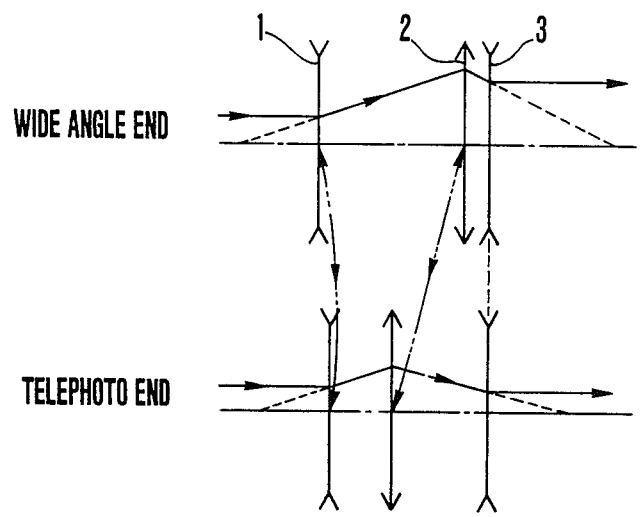
FIG. 1 is a schematic diagram illustrating the principal construction and arrangement of the elements of a finder, according to the invention as a thin lens system.
Figure 2:
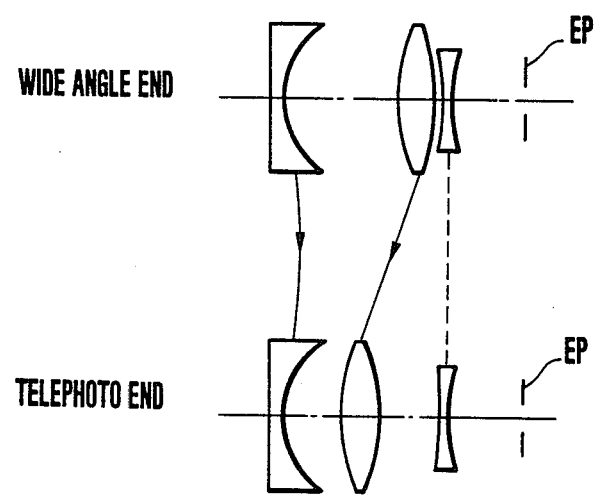
FIGS. 2 to 8 are longitudinal section views of specific embodiments 1 to 7 of lens systems.
Figure 3:
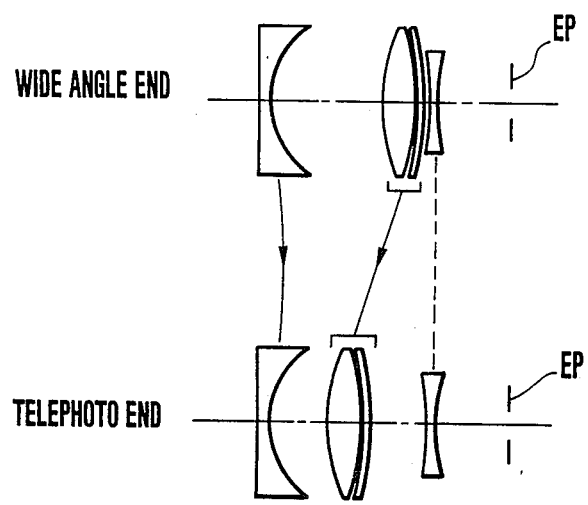
Figure 4:
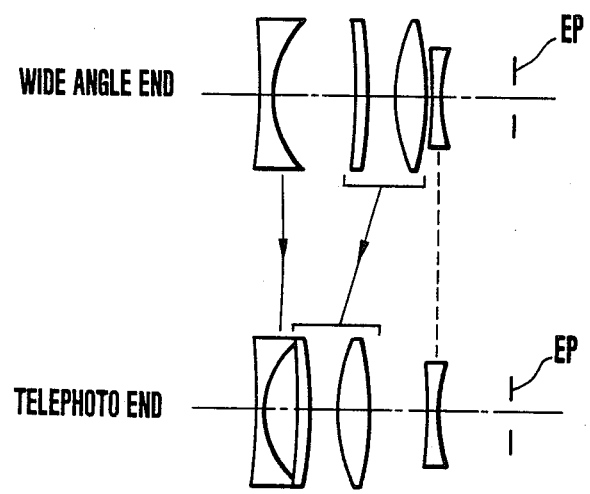
Figure 5:
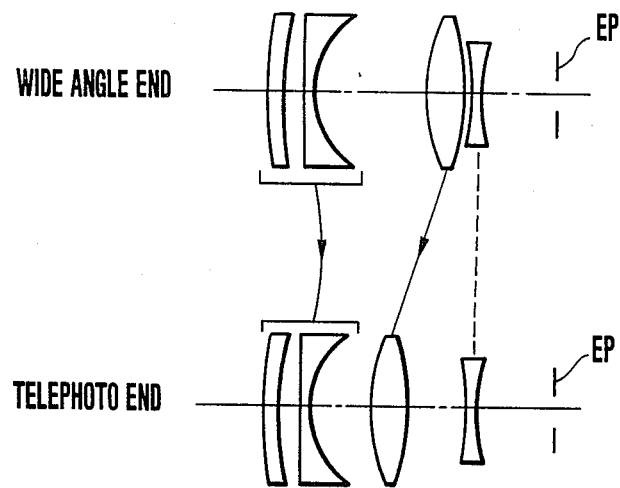
Figure 6:
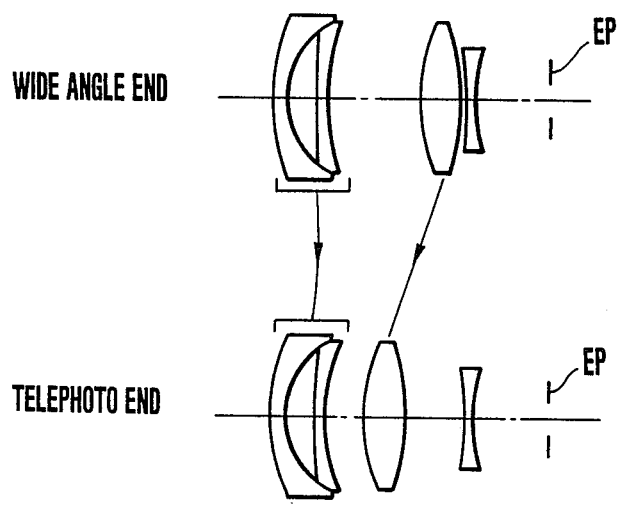
Figure 7:
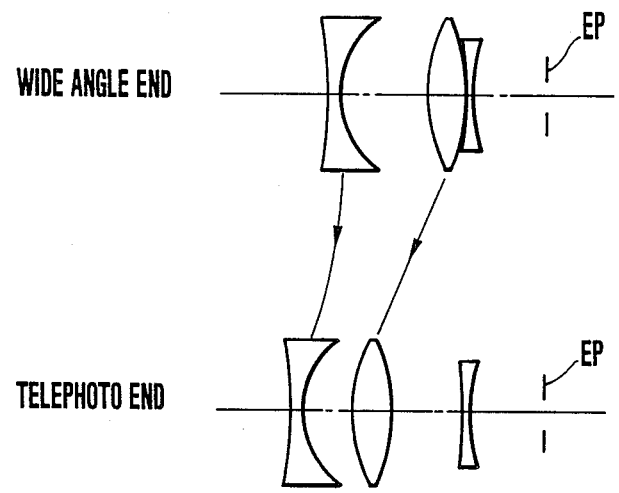
Figure 8:
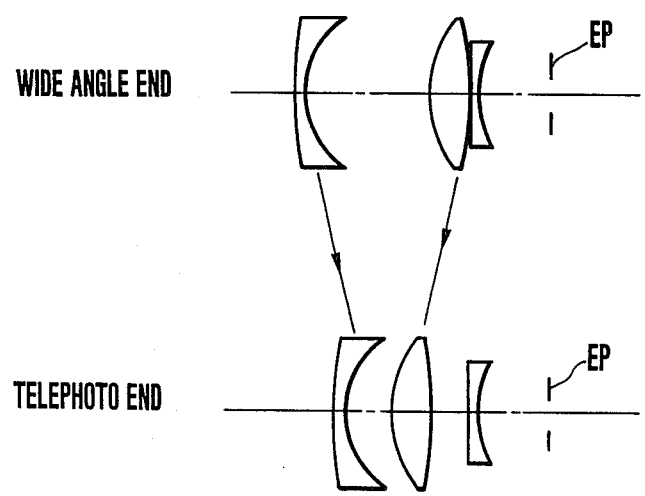
Figure 9A:
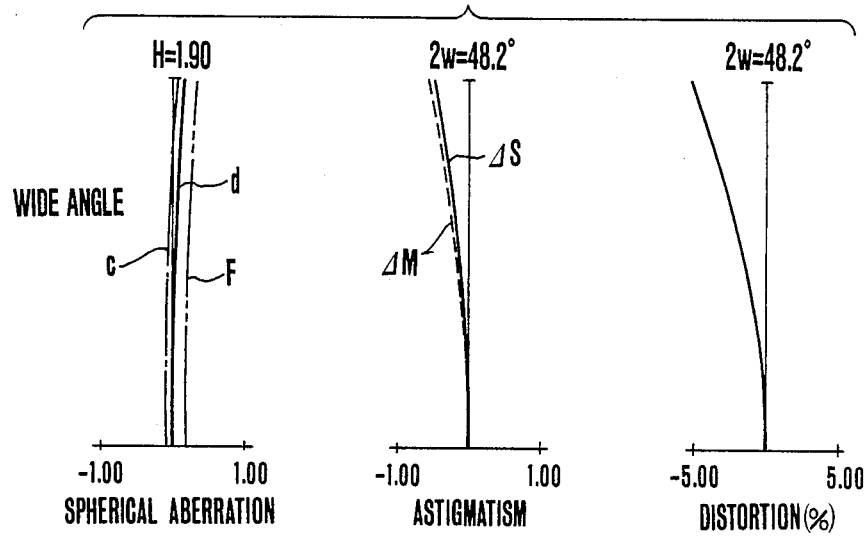
Figure 9B:
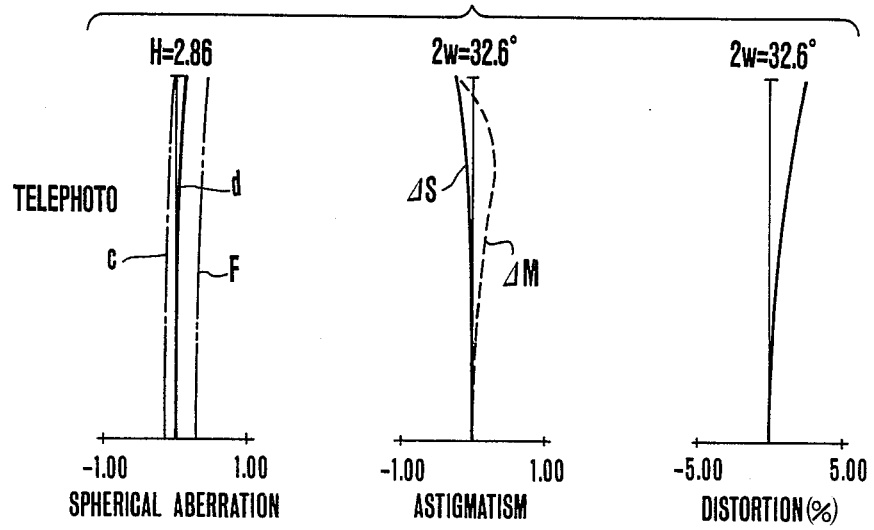
Figure 10A:
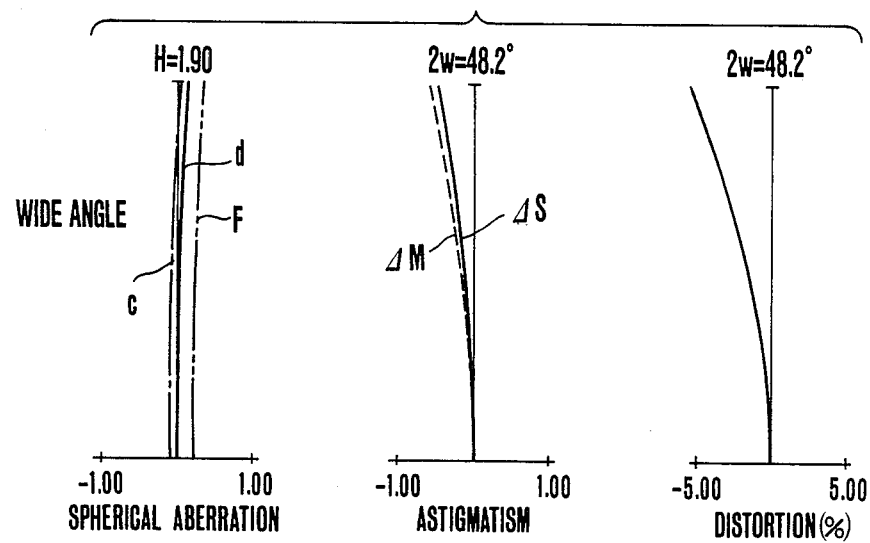
Figure 10B:
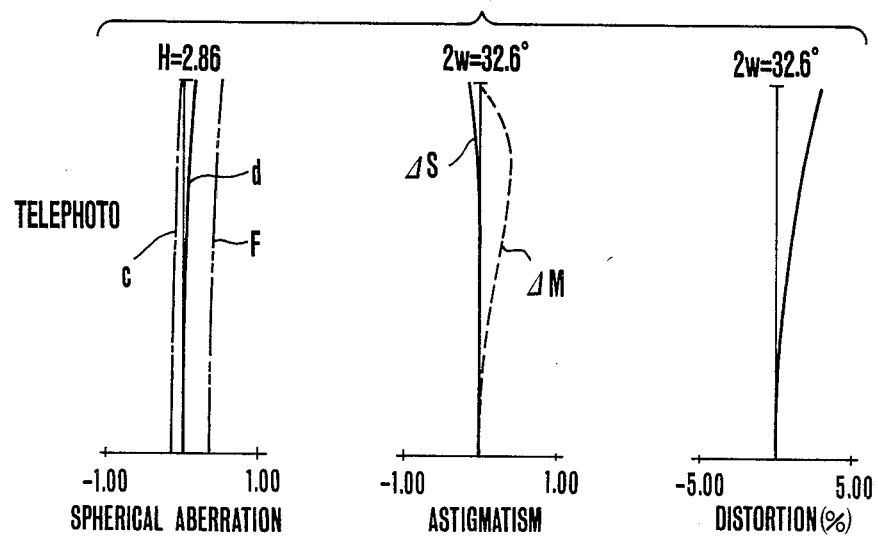
Figure 11A:
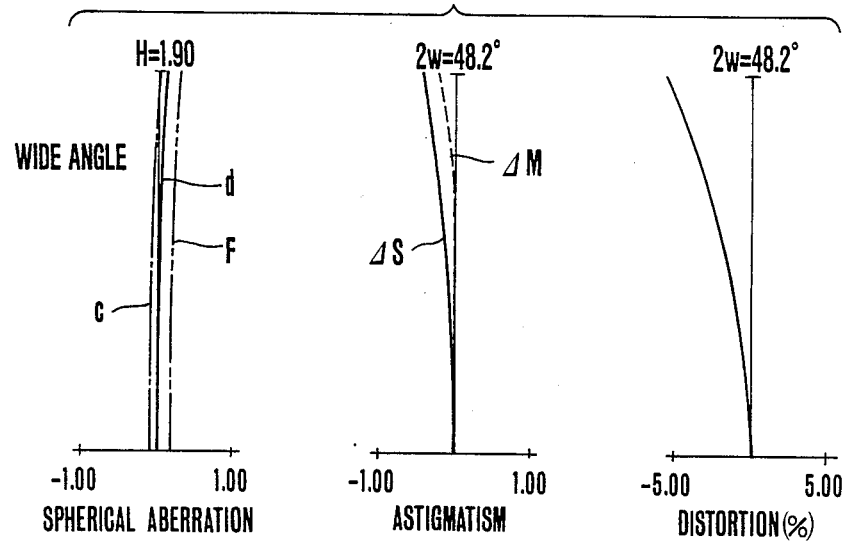
Figure 11B:
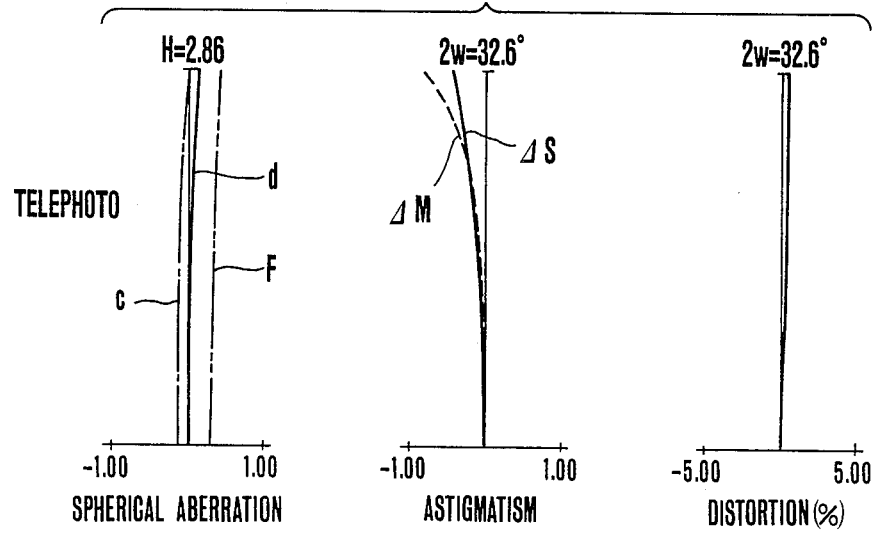
Figure 12A:
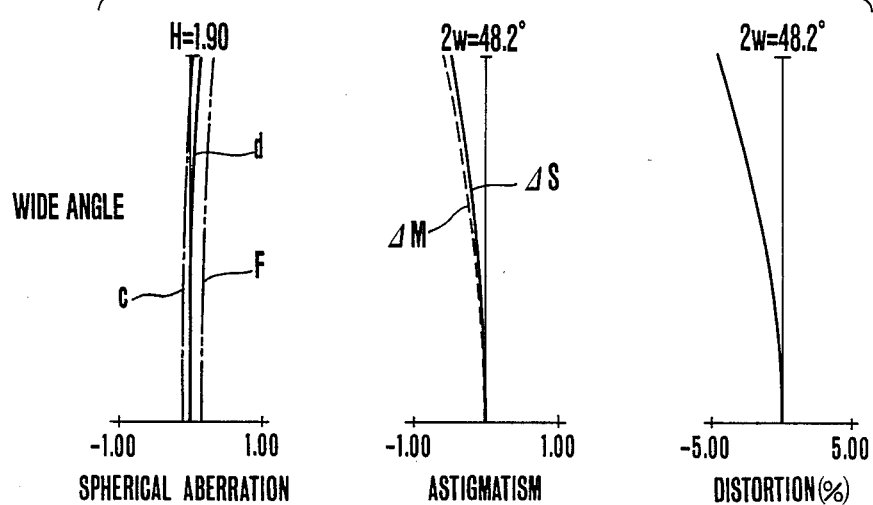
Figure 12B:
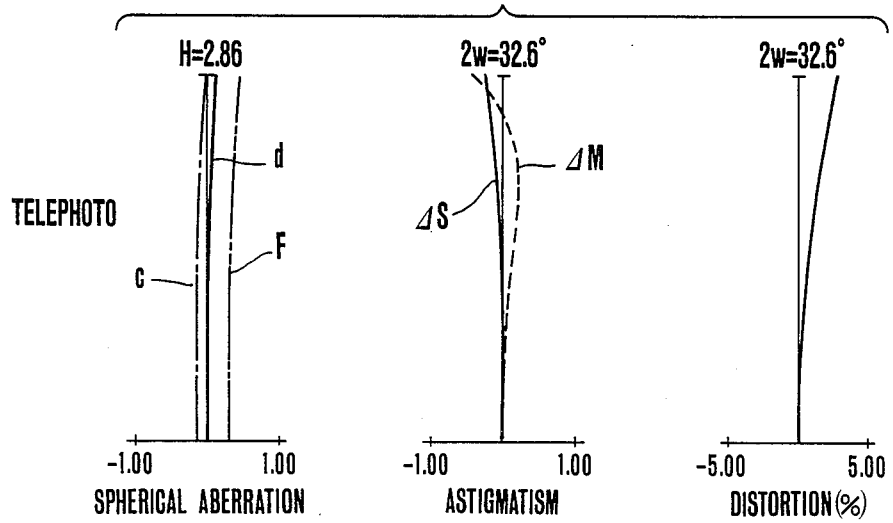
Figure 13A:
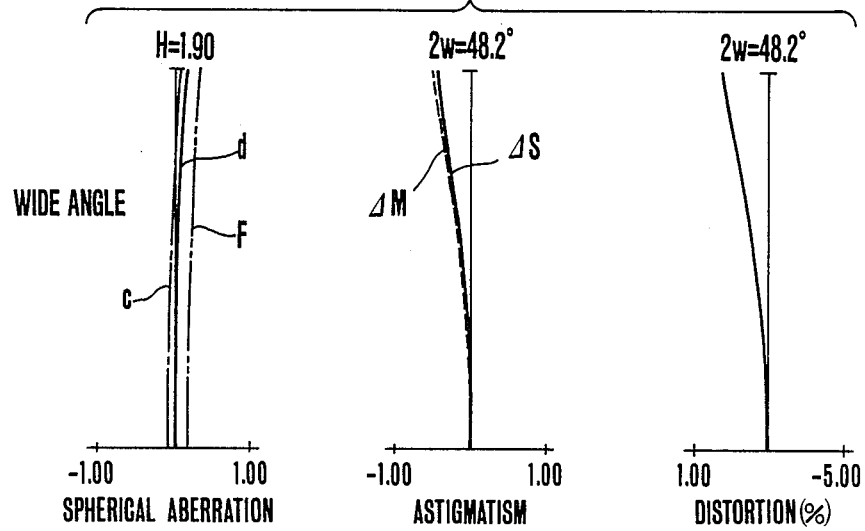
Figure 13B:
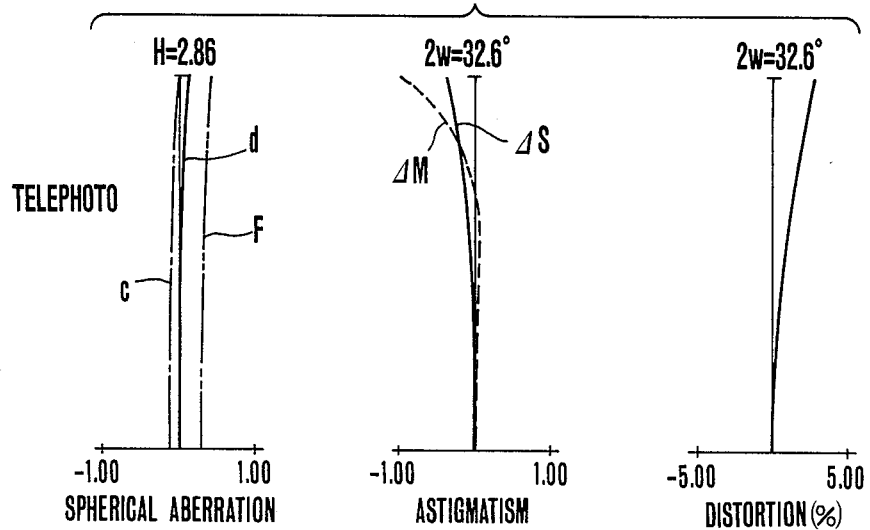
Figure 14A:
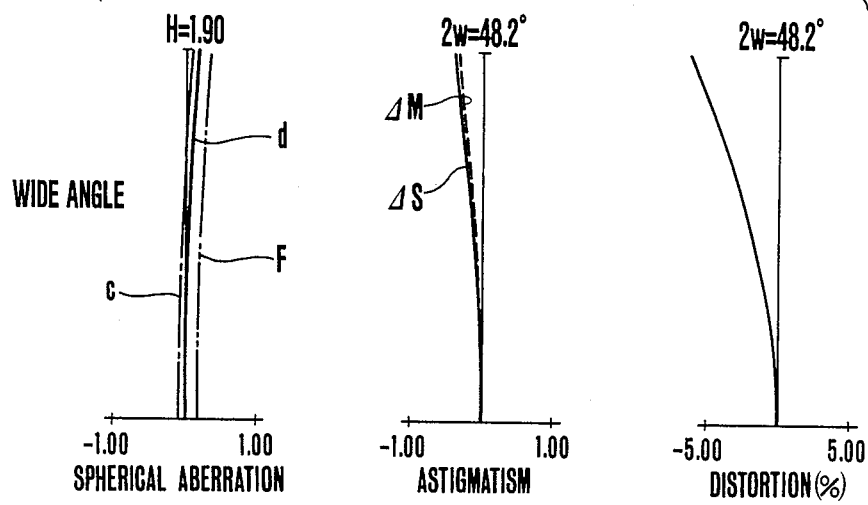
Figure 14B:
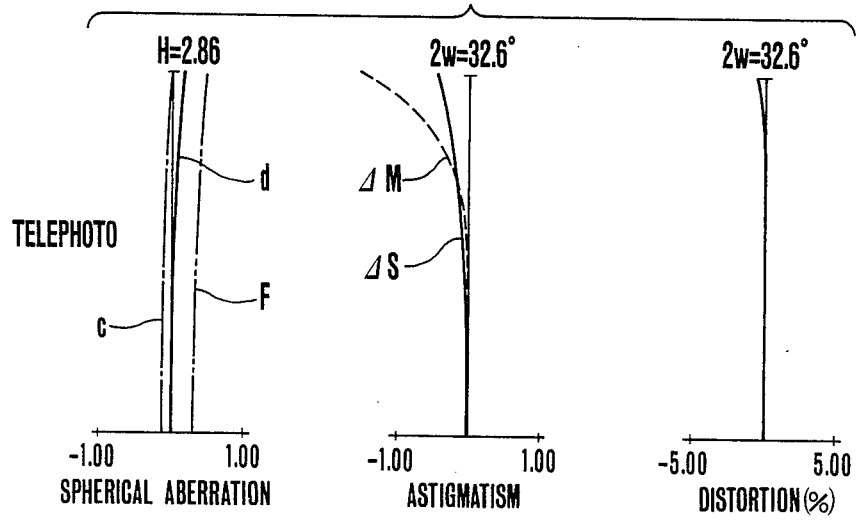
Figure 15A:
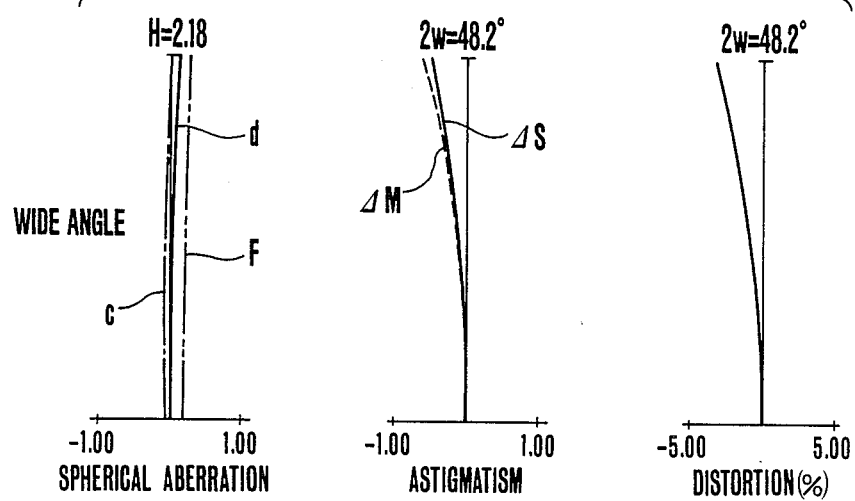
Figure 15B:
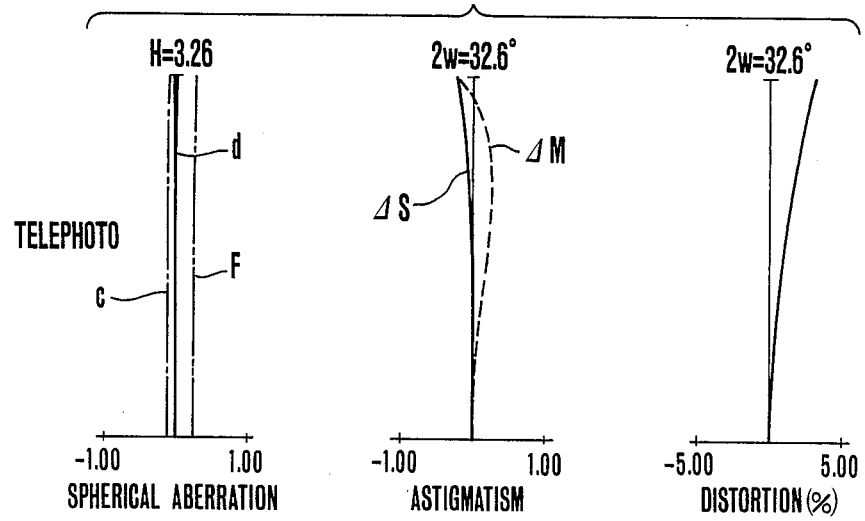

In the general embodiment of the invention shown in FIG. 1, the lens system of the finder comprises, from front to rear, a first lens unit of negative power, a second lens unit of positive power, and a third lens unit of negative power, whereby, when varying the magnification from the wide angle end to the telephoto end, the second lens unit is moved axially forward, while another lens unit, preferably the first lens unit, is simultaneously moved axially in a non-linear locus so as to compensate for diopter shift resulting from the variation of the magnification.

The use of such construction and arrangement of the lens units provides a possibility of achieving easy production of a prescribed value of the zoom ratio with as short a total axial movement of each zoom unit as possible. Moreover, because there is one lens unit which remains stationary during zooming, it enables the amount of aberrations at any point in the entire range of variation of the magnification to be reduced for a better quality of the finder image than was heretofore possible.

The features of the invention are next described in detail by reference to the drawings. In FIG. 1, the first, second and third lens units are denoted by 1, 2 and 3 respectively. In FIGS. 2 to 8, EP denotes an exit pupil. Motions of the zoom units are shown in loci with arrows indicating the directions when zooming from the wide angle end to the telephoto end.

Now, letting the focal lengths of the first, second and third lens units be denoted by $f_1$, $f_2$ and $f_3$, respectively, the magnification of the finder by $\gamma$, and the intervals between the principal points of the first and second lens units, and of the second and third lens units at the magnification $\gamma$ of the finder by $e_1(\gamma)$ and $e_2(\gamma)$, respectively, we have $$e_1(\gamma) = \frac{f_1 \cdot f_2}{\gamma \cdot f_3} + f_1 + f_2 \tag{i}$$

$$e_2(\gamma) = \frac{f_2 \cdot f_3}{f_1} \cdot \gamma + f_2 + f_3 \tag{ii}$$

where an equation for $\gamma$ in terms of the paraxial lateral magnification $\beta_2$ of the second lens unit at a certain zooming position is expressed by $$\gamma = -\frac{f_1}{f_3} \cdot \beta_2 \tag{iii}$$

For good compensation of diopter shift throughout the entire range of variation of the magnification, it is the principle of the invention that the zoom units are moved under the condition given by the equations (i) and (ii).

To reduce the variation of the aberrations with zooming, and to obtain the prescribed zoom ratio with ease, and further, to achieve minimization of the size of the entire finder system, it is preferred that within the framework of the above-stated features (i) and (ii), all the lens units are constructed so as to satisfy the following relationships:

$$0.35 < f_1/f_3 < 3.0 \tag{1}$$

$$-4 < \beta_2 < -0.5 \tag{2}$$

The inequalities of condition (1) give appropriate ranges of the refractive powers of the first and third lens units for good quality of the finder image over the entire area of the picture frame. When the upper limit is exceeded, as when the refractive power of the first lens unit becomes too weak, the aberrations which are produced by the off-axis rays, particularly field curvature, are caused to increase objectionably. When the lower limit is exceeded, as when the refractive power of the first lens unit becomes too strong, the curvature of field increases in the opposite direction to that described above.

The inequalities of condition (2) give a range of the paraxial lateral magnification $\beta_2$ which the second lens unit can take over the entire zooming range. When the absolute value of the paraxial lateral magnification $\beta_2$ exceeds the lower limit, the total movement of the second lens unit becomes long causing the size of the finder system to increase. Further, as the refractive power of the second lens unit increases, variation of the aberrations with zooming is increased. When the upper limit is exceeded, as the absolute value of the paraxial lateral magnification $\beta_2$ decreases, the movement of the second lens unit has too little an effect on varying the magnification, so that the prescribed zoom ratio is difficult to obtain by the second lens unit alone. Also in some cases, the second lens unit comes to touch the other lens unit at a point during zooming.

It should be noted that in the embodiment shown in FIG. 1, an example of a reciprocal movement of the first lens unit during zooming from the wide angle end to the telephoto end is taken. However, the locus of movement of the first lens unit changes depending on the lateral magnification during zooming. In more detail, for the value of $\beta_2 = -1$ at an intermediate position in the zooming range, the first lens unit moves reciprocatingly. For $-1 < \beta_2 < 0$ at any position in the range, the first lens unit moves always rearward when zooming from the wide angle end to the telephoto end. For $\beta_2 < -1$ at any position in the range, the first lens unit moves always forward to compensate for the diopter shift.

The above-stated conditions, when satisfied, suffice for obtaining a variable magnification finder that enables good accomplishment of the objects of the invention. Yet, despite the construction of the lens units in simple form, to preserve good quality of the finder image throughout the entire zooming range, it is preferred that the lens units are formed to the following shapes:

The first lens unit is constructed in the form of a singlet of bi-concave shape with the front surface having a stronger refractive power than that of the rear surface, the second lens unit in the form of a singlet of bi-convex shape, and the third lens unit in the form of a singlet of bi-concave shape.

As an alternative the first lens unit may be in the form of a meniscus-shaped singlet of negative power convex toward the front, the second lens unit in the form of a bi-convex singlet, and the third lens unit in the form of a bi-concave singlet.

Alternatively the first lens unit may be in the form of a bi-concave singlet whose front surface has a weaker refractive power than the rear surface, the second lens unit in the form of at least two lenses one of which is bi-convex, and the other of which is of positive meniscus shape, and the third lens unit in the form of a bi-concave singlet.

Finally, the first lens unit may be in the form of at least two meniscus-shaped lenses of negative power convex toward the front, the second lens unit in the form of bi-convex singlet, and the third lens unit in the form of a bi-concave singlet.

It is to be noted that in the invention, the third lens unit may otherwise be made movable for diopter adjustment. In addition, the third lens unit also may be constructed with two lenses of negative power, one of which is moved to adjust the diopter.

Seven examples 1 to 7 of specific lens systems of the invention can be constructed in accordance with the numerical data given in the following tables for the radii of curvature, R, the axial thicknesses or air separations, D, and the refractive indices, N, and Abbe number, $\nu$, of the glasses of the various lens elements with the subscripts numbered consecutively from front to rear. The first five examples 1 to 5 are of a type in which the first lens unit moves reciprocatingly with zooming. The sixth example is of another type in which the first lens unit moves monotonously forward when zooming from the wide angle end to the telephoto end. The seventh example is of still another type in which the first lens unit moves monotonously rearward. FIGS. 9A and 9B to 15A and 15B illustrate the aberrations of all the numerical examples, where $\Delta M$ and $\Delta S$ represent the meridional and sagittal surfaces, respectively, abscissae in the respective spherical aberrations and astigmatisms represent the diopters, and H is the height at the time of incidence.

| Numerical Example 1 (FIGS. 2, 9A and 9B) | | |
|---|---|---|
| $\gamma = 0.63 - 0.95$ | $2\omega = 32.6° - 48.2°$ | |
| $R_1 = -358.83$ | $D_1 = 2.00$ | $N_1 = 1.49171$ $\nu_1 = 57.4$ |
| $R_2 = 18.49$ | $D_2 = 24.44 - 12.97$ | |
| $R_3 = 36.96$ | $D_3 = 7.56$ | $N_2 = 1.77250$ $\nu_2 = 49.6$ |
| $R_4 = -46.59$ | $D_4 = 1.66 - 12.87$ | |
| $R_5 = -59.43$ | $D_5 = 1.49$ | $N_3 = 1.49171$ $\nu_3 = 57.4$ |
| $R_6 = 36.11$ | | |
| $\beta_2 = -0.81 - -1.21$ | | $f_1/f_3 = 0.79$ |

| Numerical Example 2 (FIGS. 3, 10A and 10B) | | |
|---|---|---|
| $\gamma = 0.63 - 0.95$ | $2\omega = 32.6° - 48.2°$ | |
| $R_1 = -264.97$ | $D_1 = 1.99$ | $N_1 = 1.49171$ $\nu_1 = 57.4$ |
| $R_2 = 18.85$ | $D_2 = 24.12 - 12.65$ | |
| $R_3 = 37.62$ | $D_3 = 7.00$ | $N_2 = 1.77250$ $\nu_2 = 49.6$ |
| $R_4 = -55.01$ | $D_4 = 0.36$ | |
| $R_5 = -62.73$ | $D_5 = 1.49$ | $N_3 = 1.69895$ $\nu_3 = 30.1$ |
| $R_6 = -48.91$ | $D_6 = 0.99 - 4.75$ | |
| $R_7 = -57.49$ | $D_7 = 1.48$ | $N_4 = 1.49171$ $\nu_4 = 57.4$ |
| $R_8 = 36.87$ | | |
| $\beta_2 = -0.81 - -1.21$ | | $f_1/f_3 = 0.79$ |

| Numerical Example 3 (FIGS. 4, 11A and 11B) | | |
|---|---|---|
| $\gamma = 0.63 - 0.95$ | $2\omega = 32.6° - 48.2°$ | |
| $R_1 = -140.95$ | $D_1 = 2.00$ | $N_1 = 1.49171$ $\nu_1 = 57.4$ |
| $R_2 = 20.15$ | $D_2 = 17.92 - 6.46$ | |
| $R_3 = -179.98$ | $D_3 = 2.83$ | $N_2 = 1.77250$ $\nu_2 = 49.6$ |
| $R_4 = -113.22$ | $D_4 = 5.74$ | |
| $R_5 = 34.64$ | $D_5 = 6.41$ | $N_3 = 1.77250$ $\nu_3 = 49.6$ |
| $R_6 = -61.71$ | $D_6 = 1.25 - 12.47$ | |
| $R_7 = -108.60$ | $D_7 = 1.50$ | $N_4 = 1.49171$ $\nu_4 = 57.4$ |
| $R_8 = 28.27$ | | |
| $\beta_2 = -0.81 - -1.21$ | | $f_1/f_3 = 0.79$ |

| Numerical Example 4 (FIGS. 5, 12A and 12B) | | |
|---|---|---|
| $\gamma = 0.63 - 0.95$ | $2\omega = 32.6° - 48.2°$ | |
| $R_1 = 108.81$ | $D_1 = 3.00$ | $N_1 = 1.49171$ $\nu_1 = 57.4$ |
| $R_2 = 68.68$ | $D_2 = 4.49$ | |
| $R_3 = 382.88$ | $D_3 = 2.00$ | $N_2 = 1.49171$ $\nu_2 = 57.4$ |
| $R_4 = 18.48$ | $D_4 = 24.31 - 12.85$ | |
| $R_5 = 35.95$ | $D_5 = 7.94$ | $N_3 = 1.77250$ $\nu_3 = 49.6$ |
| $R_6 = -48.10$ | $D_6 = 1.25 - 12.47$ | |
| $R_7 = -61.48$ | $D_7 = 1.95$ | $N_4 = 1.49171$ $\nu_4 = 57.4$ |

-continued

R₈ = 35.48

$\beta_2 = -0.81 \sim -1.21 \quad f_1/f_3 = 0.79$

Numerical Example 5 (FIGS. 6, 13A and 13B)
$\gamma = 0.63 - 0.95 \quad 2\omega = 32.6° - 48.2°$

| | | | |
|---|---|---|---|
| R₁ = 43.96 | D₁ = 2.30 | N₁ = 1.49171 | ν₁ = 57.4 |
| R₂ = 16.61 | D₂ = 7.20 | | |
| R₃ = 218.44 | D₃ = 1.94 | N₂ = 1.49171 | ν₂ = 57.4 |
| R₄ = 44.16 | D₄ = 19.48 − 8.01 | | |
| R₅ = 35.59 | D₅ = 9.08 | N₃ = 1.77250 | ν₃ = 49.6 |
| R₆ = −48.04 | D₆ = 0.98 − 12.20 | | |
| R₇ = −70.56 | D₇ = 1.50 | N₄ = 1.49171 | ν₄ = 57.4 |
| R₈ = 32.94 | | | |

$\beta_2 = -0.81 \sim -1.21 \quad f_1/f_3 = 0.79$

Numerical Example 6 (FIGS. 7, 14A and 14B)
$\gamma = 0.63 - 0.95 \quad 2\omega = 32.6° - 48.2°$

| | | | |
|---|---|---|---|
| R₁ = −82.25 | D₁ = 1.98 | N₁ = 1.49171 | ν₁ = 57.4 |
| R₂ = 19.04 | D₂ = 19.12 − 10.88 | | |
| R₃ = 35.52 | D₃ = 7.58 | N₂ = 1.77250 | ν₂ = 49.6 |
| R₄ = −49.15 | D₄ = 0.31 − 15.92 | | |
| R₅ = −106.59 | D₅ = 1.13 | N₃ = 1.49171 | ν₃ = 57.4 |
| R₆ = 36.85 | | | |

$\beta_2 = -1.12 \sim -1.69 \quad f_1/f_3 = 0.69$

Numerical Example 7 (FIGS. 8, 15A and 15B)
$\gamma = 0.73 - 1.09 \quad 2\omega = 32.6° - 48.2°$

| | | | |
|---|---|---|---|
| R₁ = 84.68 | D₁ = 2.00 | N₁ = 1.49171 | ν₁ = 57.4 |
| R₂ = 18.90 | D₂ = 27.15 − 10.54 | | |
| R₃ = 26.61 | D₃ = 6.90 | N₂ = 1.77250 | ν₂ = 49.6 |
| R₄ = −98.31 | D₄ = 0.77 − 8.51 | | |
| R₅ = −1442.80 | D₅ = 1.35 | N₃ = 1.49171 | ν₃ = 57.4 |
| R₆ = 19.14 | | | |

$\beta_2 = -0.56 \sim -0.84 \quad f_1/f_3 = 1.30$

As has been described above, according to the present invention, under the prescribed conditions, the front two of the three lens units are made movable for varying the magnification, thereby it being made possible to perfectly remove the shift of the diopter throughout the entire range and to improve the quality of the finder image. Moreover, such a variable magnification finder enables a desired zoom ratio to be obtained with ease.

What is claimed is:

1. A finder comprising, from front to rear, a first lens unit of negative power, a second lens unit of positive power and a third lens unit of negative power, so as to vary a magnification thereof while maintaining a constant diopter, said second lens unit is made to move axially forward, and, at the same time, another lens unit is made to move.

2. A finder according to claim 1, wherein said another lens unit is said first lens unit.

3. A finder according to claim 2, satisfying the following conditions:

$$0.35 < f_1/f_3 < 3.0$$

$$-4.0 < \beta_2 < -0.5$$

where $f_1$ and $f_2$ are focal lengths of said first and said third lens units, respectively, and $\beta_2$ is the paraxial lateral magnification of said second lens unit in the entire range of variation of the magnification.

4. A finder according to claim 1, wherein said first lens unit includes a negative lens whose rear lens surface has a stronger curvature than that of a front surface thereof and is concave toward the rear, and said second lens unit includes a bi-convex lens.

5. A finder comprising, from an object side, a first lens unit having a negative refractive power, an intermediate lens unit having a positive refractive power, and an ocular lens unit having a negative refractive power, wherein said first lens unit and said intermediate lens unit are simultaneously but independently moved so as to vary a magnification of the finder while maintaining a constant diopter.

6. A finder according to claim 5, satisfying the following conditions:

$$0.35 < f_1/f_3 < 3.0$$

$$-4.0 < \beta_2 < -0.5,$$

where $f_1$ and $f_3$ are focal lengths of said first lens unit and said ocular lens unit, respectively, and $\beta_2$ is the paraxial lateral magnification of said intermediate lens unit in a entire range of variation of magnification of the finder.

7. A finder according to claim 5, wherein said first lens unit includes a negative lens whose rear lens surface has a stronger curvature than that of a front surface thereof and is concave toward the rear, and said intermediate lens unit includes a bi-convex lens.

* * * * *